Oct. 30, 1962　　K. W. TANTLINGER ETAL　　3,061,364
TRAILER ROOF CONSTRUCTION
Filed June 10, 1959　　　　　　　　　　　　　　2 Sheets-Sheet 1
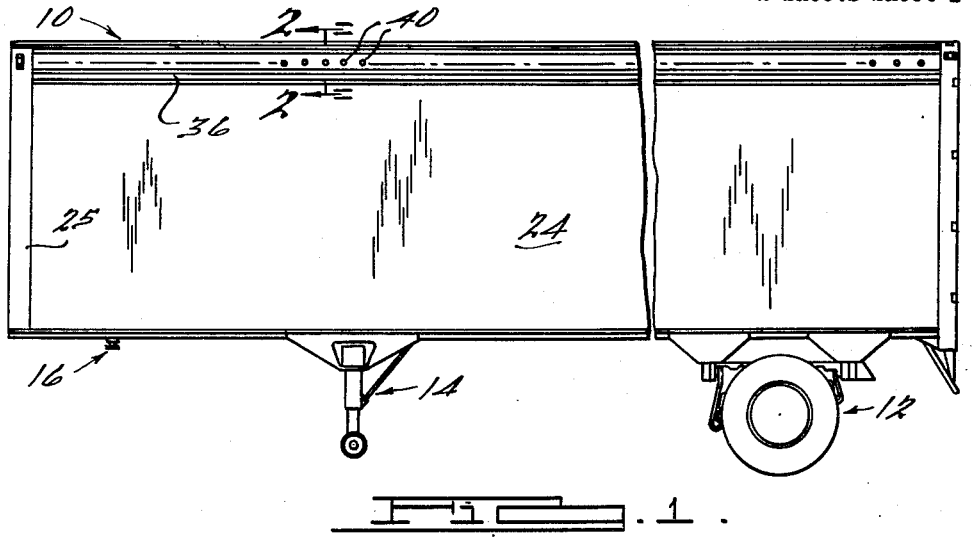
FIG. 1
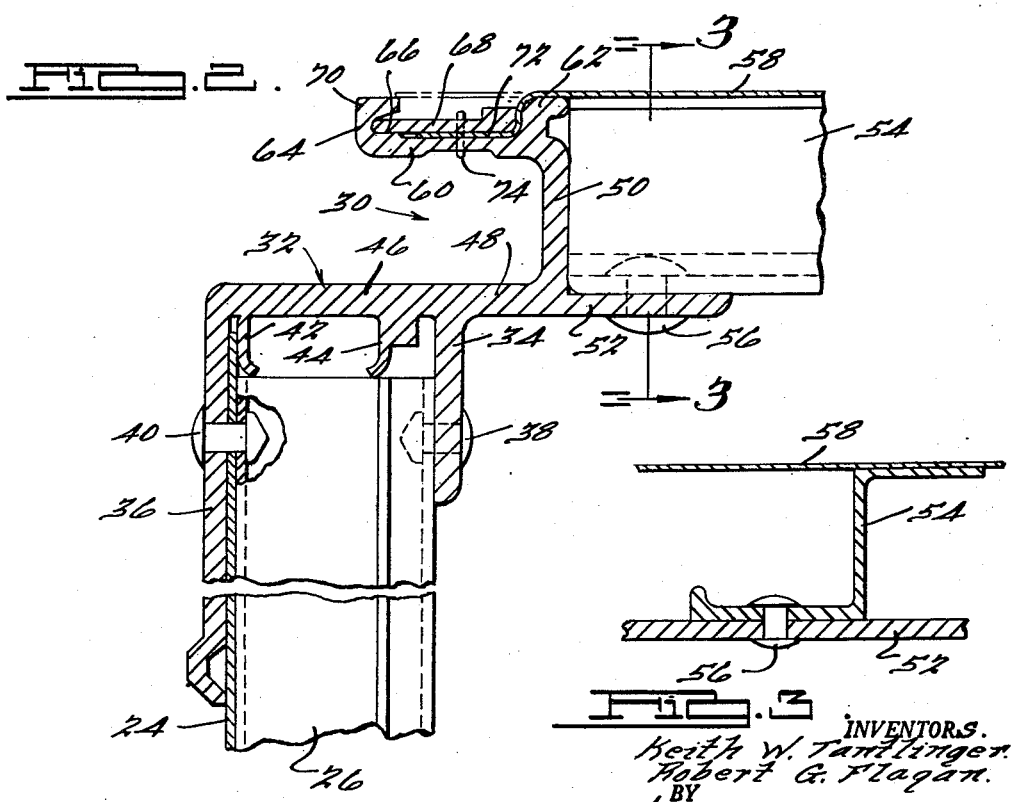
FIG. 2
FIG. 3
INVENTORS.
Keith W. Tantlinger.
Robert G. Flagan.
BY
Harness, Dickey & Pierce.
ATTORNEYS.

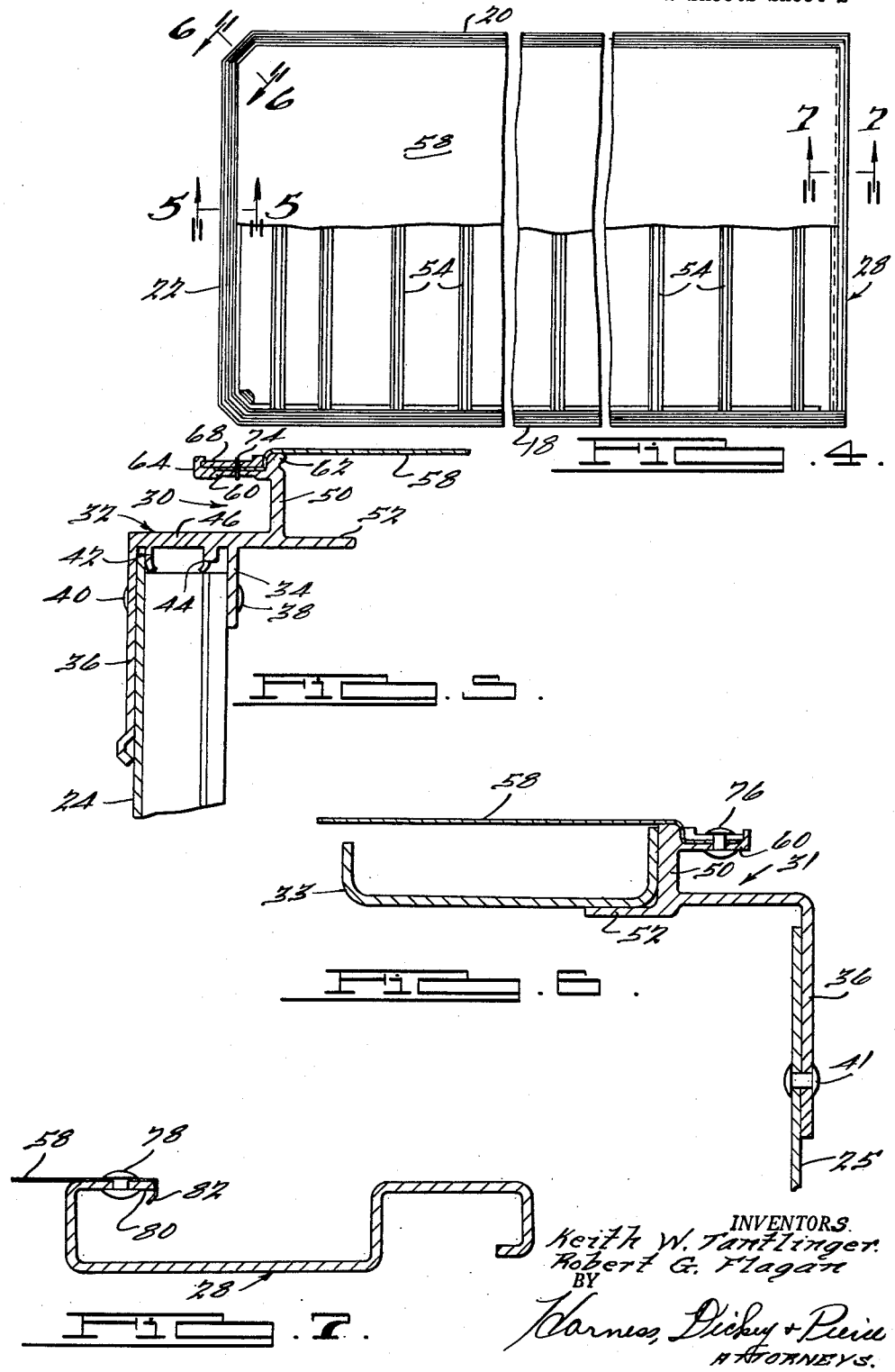

United States Patent Office 3,061,364
Patented Oct. 30, 1962

3,061,364
TRAILER ROOF CONSTRUCTION
Keith W. Tantlinger, Grosse Pointe Shores, and Robert G. Flagan, Mount Clemens, Mich., assignors to Fruehauf Trailer Company, Detroit, Mich., a corporation of Michigan
Filed June 10, 1959, Ser. No. 819,404
4 Claims. (Cl. 296—137)

This invention relates broadly to highway trailers and more particularly to an improved roof construction therefor.

An important object of the present invention is to provide a roof construction for highway trailers wherein the roof parts are uniquely assembled and correlated to assure weather tightness and to eliminate roof leaks.

Another object of the invention is to provide a roof construction for highway trailers that is simpler and therefore less expensive in construction and that can be fabricated and assembled more quickly and easier than heretofore.

Other objects and advantages of the invention will be apparent during the course of the following description.

In the drawings forming a part of this specification and wherein like numerals are employed to designate like parts throughout the same:

FIGURE 1 is a side elevational view of a van-type trailer having a roof structure embodying the invention, FIG. 2 is an enlarged, fragmentary, vertical sectional view taken on the line 2—2 of FIGURE 1, FIG. 3 is a fragmentary, vertical sectional view taken on the line 3—3 of FIG. 2, FIG. 4 is a top plan view of the trailer, a portion of the roof panel being removed for clearness of illustration, FIG. 5 is an enlarged fragmentary, vertical sectional view taken on the line 5—5 of FIG. 4, FIG. 6 is an enlarged fragmentary, vertical sectional view taken on the line 6—6 of FIG. 4, and FIG. 7 is an enlarged, fragmentary, vertical sectional view taken on the line 7—7 of FIG. 4.

In the drawings, wherein for the purpose of illustration is shown a preferred embodiment of the invention, attention is first directed to FIGURE 1 which shows a van-type highway trailer having a body 10 supported at the rearward end thereof by a conventional suspension 12 and adapted to be supported adjacent the forward end thereof by a conventional prop 14. A kingpin or upper coupler 16 is provided forwardly of the prop 14 for attachment in the usual manner to the fifth wheel of a truck-tractor.

Except for the roof assembly to which this invention is particularly directed, the body 10 may be of any suitable or conventional design and construction. Accordingly, a detailed description of the body other than the roof is not given.

The particular trailer body 10 here shown has vertical side walls 18 and 20 and a vertical front end wall 22. Both the side walls 18 and 20 and the front wall 22 are formed by sheet metal panels 24 riveted or otherwise suitably fastened to vertical posts 26. Corner posts 25 connect the side walls 18 and 20 to the front wall 22 at the front of the trailer. The rear of the trailer body 10 has conventional framing and is closed by hinged doors (not shown). A header 28 (FIG. 7) connects the side walls 18 and 20 at the top and rear thereof.

According to the present invention, each of the side walls 18 and 20 and the front wall 22 is surmounted by a cap rail 30 which conveniently can be an extruded shape having the form shown in FIGS. 2 and 5 and the cap rails 30 are joined at the front corners of the trailer by cap rails 31 of modified shape and structural connecting members 33 as shown in FIG. 6.

More particularly, each of the cap rails 30 comprises an inverted channel portion 32 having depending inner and outer flanges 34 and 36 embracing the wall with which it is associated. The outer flange 36 preferably is wider than the inner flange 34 and it engages flatly against the side panels 24 as shown in FIG. 2. Both the inner and outer flanges 34 and 36 are fastened securely to the posts 26 in any suitable manner as by rivets 38 and 40 and the corner rails 31 are fastened to the posts 25 by rivets 41. Spaced parallel depending ribs 42 and 44 within the channel section 32 bear on the top edges of the posts 26, and the upper marginal edge portions of the skin panels 24 fit snugly between the front flange 36 and the adjacent rib 42.

The middle or bight portion 46 of each channel section 32 extends laterally inwardly of the inner flange 34, as at 48, and thence upwardly at 50. A lower flange 52 extends horizontally inwardly from the portion 50 and these flanges on the side wall cap rails 30 support a plurality of spaced parallel roof bows 54, as shown in FIGS. 2-4. The roof bows 54 may be of any suitable structural shape and are here shown by way of illustration in the form of Z-bars. The lower flanges of the roof bows 54 rest upon and are supported by the cap rail flanges 52, and the two flanges are fastened together by rivets 56 (FIG. 2). The upper flanges of the roof bows 54 extend flush with the top edges of the cap rails 30.

Superimposed on the roof bows 54 and covering the area bounded by the side and front walls 18, 20 and 22 and the rear header 28 is a roof panel 58 which preferably is a single piece of sheet metal to assure a weatherproof covering for the trailer body 10. Upper laterally outwardly extending flanges 60 are formed on the upstanding portions 50 of the cap rails 30 slightly below the roof panel 58, and upstanding inner and outer parallel ribs 62 and 64 formed on the flanges 60 define shallow, longitudinally extending upwardly facing channels 66 therebetween. The inner ribs 62 extend flush with the top flanges of the roof bows 54. As shown, the roof panel 58 extends beyond the roof bows 54 and across the inner ribs 62 of the cap rails at the sides and front of the body 10 and into the channels 66.

Initially the roof panel 58 projects across the channels 66 as shown by broken lines in FIG. 2. However, at assembly, the projecting portions of the roof panel 58 are bent or warped downwardly into the channels 66 and clamped against the bottoms of the channels by retaining strips 68. In practice, the outer longitudinal edges of the retaining strips 68 are inserted under inturned lips 70 formed on the outer ribs 64 and pressed downwardly on the marginal edge portions of the roof panel 58. As the retaining strips 68 are pressed into the channels 66 they wrap the projecting marginal edge portions of the roof panel 58 around the ribs 62 and flatten them against the bottoms of the channels. If desired, the channels 66 may be recessed, as at 72 (FIG. 2), to accommodate the roof panel 58. This action stretches the roof panel over the inner ribs 62 and assures a taut condition at the margins of the roof and a tight connection between the roof panel and the front and side walls 18, 20 and 22.

After the retaining strips 68 have been pressed into the channel 66 in the manner hereinabove described, they are fastened permanently in place by wire staples or stitching 74. As shown (FIG. 2), the staples 74 extend through the retaining strips 68, the flanges 60 and the portions of the roof panel 58 clamped therebetween. The cap rails 30, the roof panel 58 and the retaining strips 68 all preferably are of aluminum and the staples 74 are stainless steel wire. The staples 74 are driven downwardly through the retaining strips 68 by conventional stapling machines and clinched on the under sides of the flanges 60. This operation can be performed easily and quickly and as many staples are used as are required to hold the connected parts securely together. The use of the metal stitching 74 eliminates the necessity of matching rivet holes in the roof panel and cap rails as heretofore required. Also, it places the holes formed in the roof panel 58 by the stitching laterally outwardly of the upstanding cap rail portion 50 and of the inner ribs 62 and below the roof of the trailer.

Because of the shape of the cap rails 30 and by reason of the location of the stitching 74 and the pressed engagement between the roof panel 58 and the ribs 62, moisture is prevented from working under the panel and gaining access to the interior of the trailer. Further weatherproofing may be and preferably is assured by placing a suitable adhesive such as "Thiokol" or the like in the channel 66 adjacent the inner rib 62 before the roof panel 58 is clamped in place by the retaining strips 68. The roof panel 58 preferably is similarly bonded to the roof bows by "Thiokol" or an equivalent elastic adhesive material.

The roof panel 58 may, if desired, be secured to the cap rails 30 by rivets 76 (FIG. 6) at points of particular stress such as the front corners of the body 10 and the rear marginal edge portion thereof preferably is similarly fastened to the rear header 28 by rivets 78. In this connection, it will be observed that the header 28 is formed with a laterally outwardly extending flange 80 which extends flush with the side cap rail ribs 62. The rear marginal edge portion of the roof panel 58 overlays and extends beyond the flange 80, and the projecting portion thereof preferably is wrapped around the flange 80 as at 82. Weatherproofing of the roof at the rear of the trailer is assured by coating the top surface of the flange 80 with an adhesive such as "Thiokol" or the like before the roof panel 58 is riveted to the header 28.

As an assembly procedure, the roof panel 58 preferably is placed initially on and adhesively secured to the roof bows 54. To this end, an adhesive such as "Thiokol" or the like is applied to the roof bows 54 and the panel 58 is placed on the bows with the latter properly located with respect to each other and to the panel. "Thiokol" is the preferred adhesive and when used, it is given an initial cure by means of pressure and heat and is allowed to complete the remainder of its cure at room temperature. The roof subassembly thus formed is dropped into place on the cap rails 30 and rear header 28 which have been previously assembly on the wall structure of the trailer body 10. Positioning of the subassembly is accomplished by alignment of the rivet holes in the lower flange of the foremost roof bow 54 with corresponding rivet holes in the side wall cap rails. As the rivet holes are aligned, rivets 56 are inserted and set. A bead of adhesive is then placed in the chanels 66 in the manner hereinabove described and the forward portion of the roof panel 58 is formed down to fit the contour of the front cap rail 30. The skin of the roof assembly is then stretched from the front toward the rear of the body 10 a sufficient amount to allow progressive alignment of the rivet holes in the roof bows with the rivet holes in the cap rails. As the rivet holes are aligned rivets 56 holding the roof bows 54 to the cap rails 30 are inserted, driven and bucked. Precut retaining strips 68 are then applied to the front cap rail and at the two front corners of the body 10 in the manner hereinabove described. The front retaining strip is fastened in place by metal stitching, as shown in FIG. 5, and the front corners of the roof panel are riveted, as shown in FIG. 6. The sides of the roof assembly are then formed down progressively from front to rear and secured by retaining strips which also are installed and stitched down progressively from front to rear. As a concluding operation, the roof panel 58 is fastened to the rear header 28 by rivets 78, as shown in FIG. 7.

What is claimed is:

1. In a highway trailer, a trailer body having side and front walls and a header extending between said side walls at the rear thereof, said side and front walls surmounted by cap rails, at least said side wall cap rails having inwardly extending horizontal flanges, all of said cap rails and said header having coplanar outwardly extending flanges exteriorly of said body, the outwardly extending flanges of said cap rails having laterally spaced upwardly extending inner and outer longitudinal ribs defining shallow channels therebetween, said outer ribs having inturned lips, each of said inner ribs having an inner side and a top edge joined by a rounded smoothly curved radius surface roof bows extending transversely between said side walls and supported at the ends thereof on the inwardly extending flanges of said side wall cap rails; and a roof panel superimposed on said bows with the marginal edge portions thereof overlapping the outwardly extending flanges of said cap rails and said header; retaining strips in said channels with one side thereof under said inturned lips, said retaining strips holding the front and side marginal edge portions of said roof panel wrapped around and stretched over the top edges and rounded radius surfaces of said inner ribs and clamped against the bottoms of said channels; wire stitching extending through said retaining strips, the flanges associated therewith and the clamped portions of said roof panel holding the same securely together; and means fastening the rear marginal portion of said roof panel to said header flange.

2. In a highway trailer, a trailer body having vertical walls at least certain of which have cap rails formed with laterally inwardly extending flanges and laterally outwardly extending flanges, the latter being exteriorly of said body and having upstanding spaced inner and outer longitudinal ribs defining shallow channels therebetween, said outer ribs having inturned lips, said inner ribs having inner sides and top edges joined by rounded smoothly curved radius surfaces and a roof subassembly comprising a plurality of spaced parallel roof bows, and a roof panel on and adhesively fastened to said roof bows, said roof subassembly covering the area bounded by said vertical walls and the ends of said roof bows supported by and fastened to said inwardly extending cap rail flanges, marginal edge portions of said roof panel extending beyond the supported ends of said bows and overhanging the channels of said cap rails; retaining strips disposed in said channels with one side thereof under and retained by said inturned lips, said retaining strips holding the projecting marginal edge portions of said roof panel stretched over the top edges and rounded radius surfaces of said inner ribs and clamped against the bottoms of said channels, and wire stitching extending through said retaining strips, said flanges and the clamped portions of said roof panel holding the same securely together.

3. In a highway trailer, a trailer body having vertical walls at least certain of which have cap rails formed with external laterally outwardly extending flanges having shallow channels provided at the outer sides thereof with inturned lips and at the inner sides thereof with roof panel supporting and bearing radius surfaces; roof bows extending between opposite vertical walls; a roof panel superimposed on said bows covering the area bounded by said vertical walls and having the marginal edge portions thereof extending into said channels; retaining strips disposed in said channels with one side thereof under and retained by said inturned lips, said retaining strips holding the adjacent marginal edge portions of said roof panel stretched over said radius surfaces and clamped against the bottoms of said channels; and wire stitching extending through said retaining strips, said outer flanges and the clamped portions of said roof panel holding the same securely together.

4. In a highway trailer, a trailer body having vertical walls at least certain of which have cap rails formed at the tops thereof with external laterally outwardly extending flanges having laterally spaced inner and outer longitudinal ribs defining shallow channels therebetween, said outer ribs having inturned lips, said inner ribs having inner sides and top edges joined by rounded smoothly curved radius surfaces; roof bows carried by said cap rails; a roof panel disposed on said bows with marginal edge portions thereof resting on said inner ribs and extending into said channels; retaining strips disposed in said channels with one side thereof under and retained by said inturned lips, said retaining strips holding the marginal edge portions of said roof panel stretched over the top edges and rounded radius surfaces of said inner ribs and clamped against the bottoms of said channels; and wire stitching extending through said retaining strips, said flanges and the clamped portions of said roof panel holding the same securely together.

References Cited in the file of this patent

UNITED STATES PATENTS

| | | |
|---|---|---|
| 1,347,881 | Vetter | July 27, 1920 |
| 2,600,140 | Torseth | June 10, 1952 |

FOREIGN PATENTS

| | | |
|---|---|---|
| 977,907 | France | Apr. 6, 1951 |
| 812,667 | Great Britain | Apr. 29, 1959 |